United States Patent [19]

Sweeney et al.

[11] Patent Number: 5,487,803
[45] Date of Patent: Jan. 30, 1996

[54] METHOD FOR OBTAINING MECHANICAL LOCK BETWEEN SURFACES

[75] Inventors: Eugene J. Sweeney, Plymouth; Gregory A. Pelts, Novi, both of Mich.

[73] Assignee: Lord Corporation, Cary, N.C.

[21] Appl. No.: 443,988

[22] Filed: May 18, 1995

Related U.S. Application Data

[63] Continuation of Ser. No. 67,501, May 25, 1983, abandoned.

[51] Int. Cl.$^6$ .............................. B32B 7/08; B32B 7/12; F16B 11/00
[52] U.S. Cl. .................... 156/91; 29/521; 156/292; 156/298
[58] Field of Search ................... 156/91, 92, 298, 156/216, 223, 292, 307.1; 29/521; 228/136, 138, 139; 428/223

[56] References Cited

U.S. PATENT DOCUMENTS

| | | | |
|---|---|---|---|
| 1,960,042 | 5/1934 | Andrus | 228/136 |
| 3,279,972 | 10/1966 | Thassy | 428/223 |
| 3,692,341 | 9/1972 | Brown | 403/408.1 |
| 3,700,514 | 10/1972 | Zito | 156/298 |
| 3,828,515 | 8/1974 | Galgoczy | 29/526 |
| 4,008,845 | 2/1977 | Bleckmann | 29/521 |
| 4,353,951 | 10/1982 | Yukitoshi et al. | |
| 4,560,607 | 12/1985 | Sumner | 156/298 |
| 4,770,585 | 9/1988 | Astl | 403/282 |
| 4,866,108 | 9/1989 | Vachon et al. | |
| 4,971,859 | 11/1990 | Kimura et al. | |
| 5,008,304 | 4/1991 | Kmentt | |
| 5,237,734 | 8/1993 | Polon | 29/521 |

FOREIGN PATENT DOCUMENTS

0289632A1  11/1988  European Pat. Off. .

OTHER PUBLICATIONS

Michael Clark, "Tapes and Structural Bonding Reduce Radar Unit Cost," Adhesives Age, Jun. 1991, pp. 28–34.
SAE J1523 Jun. 85 (SAE Recommended Practice) "Metal to Metal Overlap Shear Strength Test for Automotive Type Adhesives".

*Primary Examiner*—Michael W. Ball
*Assistant Examiner*—Daniel J. Stemmer
*Attorney, Agent, or Firm*—Wayne W. Rupert

[57] ABSTRACT

A method for obtaining a mechanical lock between two surfaces by providing particulate granules between the surfaces and forcing the surfaces toward one another at a pressure sufficient to embed a substantial number of the particulate granules in both of the surfaces. The method is preferably utilized during the formation of a hem flange, so as to provide immediate handling strength to the hem flange without the need for adhesive compositions.

23 Claims, 1 Drawing Sheet

5,487,803

METHOD FOR OBTAINING MECHANICAL LOCK BETWEEN SURFACES

This is a continuation of application Ser. No. 08/067,501 filed on May 25, 1993 now abandoned.

FIELD OF THE INVENTION

The present invention relates to a method for obtaining a mechanical lock between two surfaces so as to prevent shifting of the surfaces with respect to one another. More specifically, the present invention relates to a method for obtaining a mechanical lock between two surfaces by embedding particulate granules in the two surfaces.

BACKGROUND OF THE INVENTION

In numerous industrial techniques and processes, it is often desirable to prevent the shifting of adjacent surfaces with respect to one another. One of these industrial techniques can be found in the manufacture of closures, such as doors or hoods for automobiles or other transportation vehicles. These closures require a double layer of steel which is typically formed by joining two planar surfaces or panels of steel. An inner panel is positioned within an outer panel with the edge of the outer panel extending beyond the edge of the inner panel. The edge of the outer panel is then folded or crimped over the edge of the inner panel in a process known as hemming, and the resulting structure is known as a hem flange.

In order to permanently secure the inner panel with respect to the outer panel of a hem flange, an adhesive is applied between the overlapping metal surfaces and cured, or the two panels are welded together to form the permanent hem-flange assembly. After formation of the hem flange and just prior to any permanent adhesive cure or welding, the hem flange is transported and handled, and shifting of the panels with respect to one another often occurs, which can result in numerous problems in the manufacturing process. It is therefore desirable to utilize an adhesive composition having some initial green strength or handling strength or to utilize other means so as to obtain some degree of immediate handling strength to prevent shifting of the panels just prior to permanent cure or welding.

Various adhesive compositions have been developed in an attempt to provide the initial handling strength desirable in the formation of hem flanges. Examples of these adhesive compositions can be found in, for example, U.S. Pat. Nos. 4,703,809; 4,855,001; 4,857,131; and 5,096,962. It has proven to be relatively difficult to formulate a one-part adhesive composition having both high handling strength and sufficient stability or shelf-life characteristics. Most adhesive compositions having adequate handling strength and shelf life are only available in two-part formulations which require expensive application techniques and equipment and require that panels be mated within a short period of time after mixture and application of the two parts of the adhesive.

Another method of providing initial handling strength to hem flanges is the utilization of induction-cure equipment in combination with an adhesive composition. The induction-cure equipment is used to heat up the metal panels of the hem flange to pre-gel the adhesive composition so as to obtain handling strength. However, induction-cure equipment is expensive and burdensome.

When utilizing adhesive compositions in the formation of hem flanges, it has also been proposed to employ spherical glass beads in order to maintain a consistent thickness of the adhesive composition applied between the metal panels. The glass beads act as spacers and prevent the metal panels from squeezing out the adhesive which could result in adhesive bond failure.

SUMMARY OF THE INVENTION

It has presently been discovered that, if utilized properly, certain particulate granules, such as glass beads, can actually provide handling strength to surfaces independent of the strength of an adhesive composition applied between the surfaces. The present invention therefore eliminates the need for high handling strength adhesive compositions and the corresponding expensive application and induction cure equipment. More specifically, the present invention relates to a method for obtaining a mechanical lock between two surfaces comprising the steps of providing particulate granules between the two surfaces wherein the particulate granules have a compressive strength that is greater than the respective yield strength of each of the two surfaces, and forcing the two surfaces toward one another at a pressure sufficient to embed a substantial number of the particulate granules in both of the surfaces. It has surprisingly been discovered that by forcing a substantial number of the particulate granules to embed in both of the surfaces, a significant mechanical lock or handling strength independent of any adhesive strength can be realized which allows the hem flange to be transported and handled before any permanent adhesive cure.

The method of the present invention is preferably utilized in the formation of a hem flange. The invention therefore also relates to a method of forming a hem flange comprising the steps of:

(a) positioning a first panel adjacent to a second panel such that the edge of the second panel extends beyond the edge of the first panel;

(b) providing particulate granules between the overlapping portion of the two panels wherein the particulate granules have a compressive strength that is greater than the respective yield strength of each of the two surfaces;

(c) folding the non-overlapping portion of the second panel over the edge of the first panel; and (d) applying pressure to the overlapping portion of the panels so that a substantial number of the particulate granules are embedded in both of the panels.

DETAILED DESCRIPTION OF THE INVENTION

Figure 1:
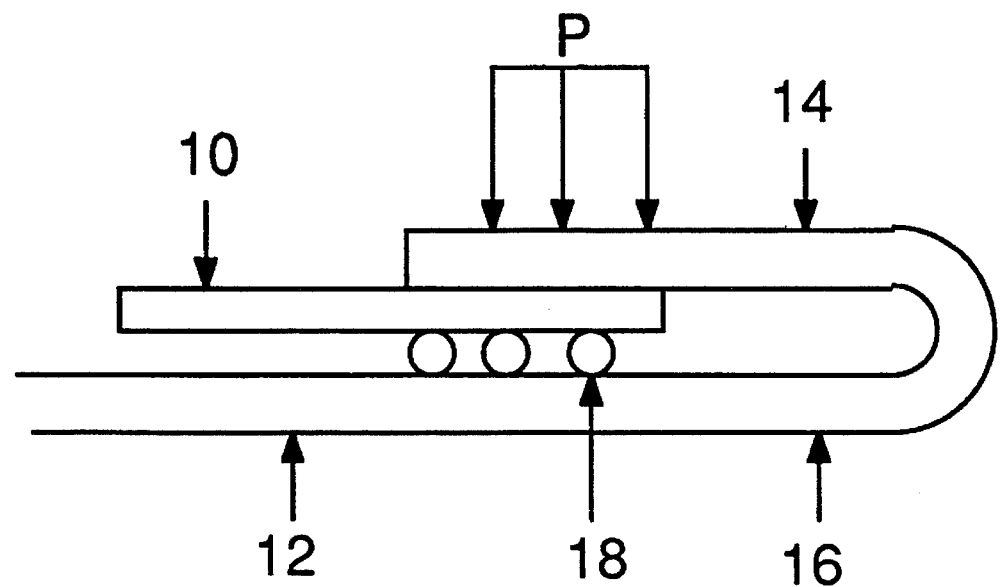
FIG. 1 is a diagrammatic sketch of a hem flange having particulate granules provided between the two metal panels just prior to the exertion of pressure by a hemming die.

The present invention relates to a method for obtaining a mechanical lock between two surfaces comprising the steps of providing particulate granules between the two surfaces wherein the particulate granules have a compressive strength that is greater than the respective yield strength of each of the two surfaces, and forcing the two surfaces toward one another at a pressure sufficient to embed a substantial number of the particulate granules in both of the surfaces.

The surfaces suitable for use in the method of the present invention can essentially be any surface having a sufficient thickness so as to be capable of being embedded by a particulate granule and is preferably a planar surface such as a panel. The surface is preferably a malleable surface such as a metallic surface. The surface can be comprised of various metals including steel, iron, aluminum, brass, copper, and the like. The surface may also be comprised of various non-metallic materials such as thermoset resins and thermoplastics. Examples of thermoset resins include glass-filled epoxy resins and glass-filled polyesters, while examples of thermoplastics include polyureas and polycarbonates. The present method may be utilized to mechanically lock two identical, two similar, or two dissimilar surfaces. It is presently preferred to utilize planar steel panels in the method of the present invention, such as the coldrolled steel and galvanized steel utilized in the manufacture of hem flanges for transportation vehicles. Steel panels utilized in the formation of hem flanges typically have a thickness ranging from about 0.020 to 0.060, preferably from about 0.028 to 0.032 inches.

As stated above, the yield strength of the surface must be less than the compressive strength of the particulate granules. The yield strength of a surface is typically available from the supplier of the particular surface and, as is known in the art, is usually obtained from the stress-strain curve of the material of which the surface is comprised.

The particulate granules useful in the method of the present invention can be comprised of any material having a compressive strength higher than the yield strength of the surface to be embedded. Examples of materials from which the granules may be derived include glass, ceramics, and hard metals such as stainless steel or titanium. The granules can have any shape or size that will allow the granules to be partially or fully embedded into two opposing surfaces and the granules preferably have a substantially spherical shape. It is presently preferred to utilize spherical glass beads as the particulate granules of the present invention.

If spherical, the particulate granules may have any desired diameter depending on the space required or needed between the two surfaces after embedment. In hem flange applications utilizing substantially spherical granules, the spherical granules will typically have a diameter ranging from about 0.005 to 0.050, preferably from about 0.010 to 0.020 inches. The granules utilized in any given application should have as uniform a distribution of diameter as possible but some variance in diameter among granules may be tolerated. Where diameter variation is present, the larger diameter granules will become embedded before the smaller diameter granules during the formation of the hem flange.

As stated above, the compressive strength of the granules must be greater than the respective yield strength of each of the two surfaces. When two dissimilar surfaces having different yield strengths are to be mechanically locked, the compressive strength of the particulate granules must be greater than each of the respective yield strengths of the two surfaces, taken individually. In this case, the degree of embedment in each surface may vary in relation to the yield strength of the particular surface. The compressive strength of a particulate granule is typically available from the supplier of the particular granule and may be determined by loading the granule between hardened surfaces until fracture, as is known in the art.

The particulate granules may be provided between the two surfaces in a variety of ways. For example, the granules may be provided between the surfaces in pure form, or may be provided between the surfaces in combination with a carrier material. The carrier material can essentially be any type of liquid or viscous media. Examples of carrier materials useful in the invention include various polymeric materials such as polyurethanes, epoxy resins and acrylic polymers.

In the case of the manufacture of a hem flange, the carrier material may be an adhesive composition traditionally utilized to bond hem flanges. However, it is not necessary for the adhesive itself to have significant initial handling strength since the embedded particulate granules will independently provide handling strength. The adhesive composition to be utilized as a carrier material in hem flange applications can be any of the traditional adhesive compositions utilized in hem flange operations, such as the acrylic adhesive compositions described in U.S. Pat. Nos. 4,703,809; 4,855,001; 4,857,131; and 5,096,962. The adhesive compositions may be utilized as one-part or two-part adhesive compositions as is known in the art, and the granules may be contained in either or both of the two parts, in the case of a two-part system. The adhesive composition containing the particulate granules may be applied to the panels to be locked before the hem flange is formed, or may be injected into a pre-formed hem flange prior to application of pressure by a hemming die to embed the granules.

The amount of particulate granules provided between the surfaces will vary depending on the application and the desired effect. In the case of hem flange applications utilizing spherical particulate granules, the spherical particulate granules will be typically employed with a carrier material in a concentration ranging from about 2 to 25, preferably from 3 to 10, percent by volume of the carrier material.

The two surfaces to be mechanically locked may be forced towards one another through the utilization of a die or press or any other available means. As stated above, the two surfaces must be forced towards one another at a pressure sufficient to embed a substantial number of the particulate granules into each surface. As utilized herein, the term "substantial number" refers to the number of particulate granules that must be embedded in order to obtain a sufficient mechanical lock in a given application and typically is at least a majority of the particulate granules. The force required to embed a substantial number of the particulate granules will vary depending on the desired degree of embedment and the yield strengths of the particular surfaces to be locked. In hem-flange applications utilizing steel panels, the inner and outer panels are deemed to be mechanically locked when the pressure necessary to shift the inner panel with respect to the outer panel (hereinafter "shifting force") is greater than about 50 psi. Therefore, with respect to hem flange applications, the term "substantial number" herein refers to the number of particulate granules that must be embedded in order to obtain a shifting force of greater than about 50 psi.

In the case of hem flange applications involving steel panels, a pressure ranging from about 3,500 to 11,000 psi, preferably from about 6,000 to 8,000 psi, is typically required when utilizing spherical particulate granules. The pressure should be applied uniformly over the overlapping portion of the panels in order to ensure that a substantial number of granules become embedded and the pressure should be applied in a manner that will not completely crush the particulate granules although a few granules may be crushed during the process without an adverse effect on the locking strength. In addition, the pressure is preferably applied in a manner that will not force the particulate granules completely through the opposing side of the panel so as to cause unsightly bumps on the outer surface of the hem flange. Typically, a higher concentration or diameter of glass beads will require a higher pressure to obtain a given degree of embedment.

The embedding pressure described above is to be distinguished from the pressure utilized to prepare hem flange assemblies with glass beads acting only as mechanical spacers to maintain consistent adhesive thickness. It should be noted that a small number of the larger glass beads in a given application may randomly become partially embedded during a hem flange process utilizing glass beads as mechanical spacers. However, this random and minor embedment will in no way provide the mechanical lock defined by the present invention.

Figure 2:
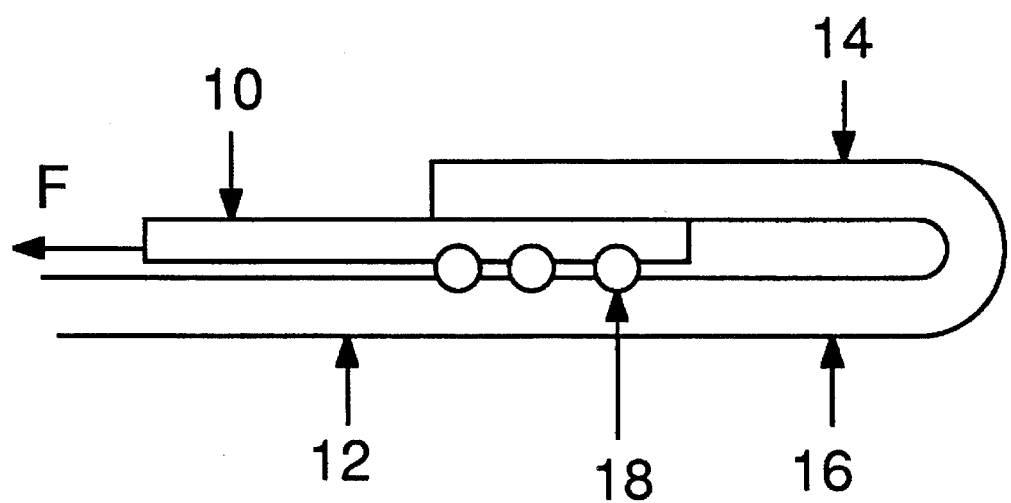
FIG. 2 is a diagrammatic sketch of a hem flange after the application of pressure by a hemming die so as to show the embedment of the particulate granules in both of the metal panels.

The procedure of embedding substantially spherical particulate granules in a hem flange is depicted in FIGS. 1 and 2. As can be seen in FIG. 1, an inner panel 10 has been positioned adjacent to an outer panel 12 and the edge of outer panel 12 that extends beyond the edge of inner panel 10 has been folded or crimped over the edge of inner panel 10 so as to form an outer panel, upper portion 14 and an outer panel, lower portion 16. Glass beads 18 have been provided between the overlapping portion of inner panel 10 and outer panel 12. A hemming die, exerts a pressure P on outer panel, upper portion 14, so as to force inner panel 10 in the direction of outer panel, lower portion 16. FIG. 2 shows that the spherical granules 18 have become embedded in both inner panel 10 and outer panel, lower portion 16. The spherical granules form a mechanical lock between the two panels so as to resist a shearing force F.

When carrying out the method of the present invention, particularly in non-hem flange applications, a slight degree of experimentation may be required to determine the optimum size and amount of granules required to impart a desired mechanical lock to two opposing surfaces at any given force. This slight degree of experimentation will be well within the ability of one of ordinary skill in the art.

The following examples are provided for purposes of illustrating the invention and should not be construed to limit the scope of the invention which is defined by the claims.

EXAMPLE 1

FIGS. 1 and 2 will be used for reference purposes in describing the procedure of this example.

Two 1-inch×4-inch steel coupons having a thickness of about 0.030 inches and a yield strength of 27,000 psi are overlapped lengthwise and then formed in the shape of a hem flange as shown in FIG. 1. Just prior to formation of the hem flange, an acrylic adhesive composition (VERSILOK 252—Lord Corporation) containing approximately 10 percent by volume spherical glass beads having a compressive strength of 55,000 psi and a mean diameter of 0.010 inches is applied between the overlapping portion of inner panel 10 and outer panel 12. The adhesive is utilized in the absence of a curative and acts only as a carrier material. Approximately 0.002 cubic inches of the adhesive is applied between the ½-inch by 1 inch rectangular overlap between the panels. A pressure P of approximately 3600 psi is then uniformly applied to outer panel, upper portion 14, to embed the glass beads.

Comparative Example 2

A hem flange assembly is prepared in accordance with Example 1, except that no glass beads are contained in the carrier material.

Tensile Testing

The hem flange assemblies prepared in accordance with Examples 1 and 2 are tested for tensile strength by adhesively bonding a third metal coupon to outer panel, lower portion 16. Pressure is then exerted as a shearing force F, as shown in FIG. 2, by the use of an Instron tensile machine. The pounds of pressure required to pull the inner panel from the outer panel is then recorded for 8 different specimens of both Examples 1 and 2. The average pounds of force required to separate the panels of the hem flange assembly of Example 1 is 50 lbs., whereas the average force required to separate the panels of the hem flange assembly of Example 2 is 6.5 lbs.

The above example demonstrates the substantial handling strength independently provided by embedded particulate granules in the formation of a hem flange in accordance with the method of the present invention.

What is claimed is:

1. A method of forming a hem flange assembly, comprising the steps of:

(a) positioning a first panel adjacent to, but not contacting, a second panel such that an edge of the second panel extends beyond an edge of the first panel;

(b) providing spherical particulate granules and an adhesive between the overlapping portion of the two panels wherein the spherical particulate granules have a compressive strength that is greater than the respective yield strength of each of the two panels;

(c) folding the non-overlapping portion of the second panel over the edge of the first panel;

(d) applying pressure of 3,500 to 11,000 psi to the overlapping portion of the panels so that the panels move toward each other to a point where they remain a spaced distance apart and a substantial number of the spherical particulate granules are embedded in both of the panels, such that the pressure necessary to shift the first panel with respect to the second panel requires a shifting force greater than about 50 psi resulting in a temporary mechanical lock between the panels; and (e) curing the adhesive to obtain a final lock between the panels and form the hem flange assembly.

2. A method according to claim 1 wherein the panels are each comprised of a metallic material or a non-metallic material.

3. A method according to claim 2 wherein the metallic material is selected from the group consisting of steel, iron, aluminum, brass, and copper; and the non-metallic material is selected from the group consisting of glass-filled epoxy resin, glass-filled polyester, polyurea and polycarbonate.

4. A method according to claim 1 wherein the panels are planar and are comprised of steel and the particulate granules are spherical glass beads.

5. A method according to claim 4 wherein the pressure ranges from about 6,000 to 8,000 psi.

6. The method according to claim 1 further comprising subjecting the panels after step (d) to transporting and handling prior to achievement of the final lock in step (e).

7. The method according to claim 1 wherein the pressure applied in step (d) is applied uniformly over the overlapping portion of the panels.

8. The method according to claim 1 wherein the adhesive acts as a carrier material for the spherical particulate granules.

9. A method of forming a hem flange with a mechanical lock between a first panel and second panel, comprising the steps of:
(a) positioning a first panel adjacent to, but not contacting, a second panel such that an edge of the second panel extends beyond an edge of the first panel;
(b) providing spherical particulate granules and an adhesive between the overlapping portion of the two panels wherein the spherical particulate granules have a compressive strength that is greater than the respective yield strength of each of the two panels;
(c) folding the non-overlapping portion of the second panel over the edge of the first panel;
(d) positioning the overlapping portion of the panels in a hemming die or press;
(e) applying pressure of 3,500 to 11,000 psi via the hemming die or press to the overlapping portion of the panels so that the panels are moved toward each other to a point where they remain a spaced distance apart and a substantial number of the spherical particulate granules are embedded in both of the panels to form a mechanical lock, such that the pressure necessary to shift the first panel with respect to the second panel requires a shifting force of greater than about 50 psi, and such that said mechanical lock is obtained substantially only by said spherical particulate granules (f) curing the adhesive to obtain a final lock between the panels and form the hem flange.

10. A method according to claim 9 wherein the panels are planar steel panels.

11. The method according to claim 10 wherein the pressure ranges from 6,000 to 8,000 psi.

12. A method according to claim 10 wherein the steel panels have a thickness ranging from about 0.020 to 0.060 inches.

13. A method according to claim 12 wherein the thickness ranges from about 0.028 to 0.032 inches.

14. A method according to claim 9 wherein the particulate granules are comprised of a material selected from the group consisting of glass, ceramic, stainless steel and titanium.

15. A method according to claim 9 wherein the particulate granules are comprised of glass.

16. A method according to claim 9 wherein the spherical granules have a diameter ranging from about 0.005 to 0.050 inches.

17. A method according to claim 16 wherein the diameter ranges from about 0.010 to 0.020 inches.

18. A method according to claim 9 wherein the adhesive is a polymeric material selected from the group consisting of polyurethanes, epoxy resins, and acrylic polymers.

19. A method according to claim 9 wherein the adhesive is an acrylic adhesive composition.

20. A method according to claim 9 wherein the particulate granules are spherical glass beads and are utilized in an amount ranging from about 2 to 25 percent by volume of the adhesive.

21. A method according to claim 20 wherein the amount ranges from about 3 to 10 percent by volume of the carrier material.

22. The method according to claim 9 wherein the pressure applied in step (d) is applied uniformly over the overlapping portion of the panels.

23. The method according to claim 9 wherein the adhesive acts as a carrier material for the spherical particulate granules.

* * * * *

UNITED STATES PATENT AND TRADEMARK OFFICE
CERTIFICATE OF CORRECTION

PATENT NO. : 5,487,803
DATED : January 30, 1996
INVENTOR(S) : Eugene J. Sweeney, et al.

It is certified that error appears in the above-indentified patent and that said Letters Patent is hereby corrected as shown below:

On the title page,

IN THE RELATED U.S. APPLICATION DATA

Field 63, Replace "1983" with --1993--.

Signed and Sealed this

Twenty-fifth Day of June, 1996

Attest:

BRUCE LEHMAN

Attesting Officer

Commissioner of Patents and Trademarks